Patented Aug. 30, 1938

2,128,613

UNITED STATES PATENT OFFICE 2,128,613

PROCESS FOR THE TREATMENT OF FIBROUS MATERIALS

Walter Kling and Ernst Götte, Chemnitz, Germany, assignors to Boehme Fettchemie-Gesellschaft m. b. H., Chemnitz, Germany No Drawing. Application August 28, 1935, Serial No. 38,326. In Germany August 28, 1934

4 Claims. (Cl. 8—20)

This invention relates to a process of treating fibrous materials to alter and improve the finish and is particularly concerned with the treatment of lustrous fabrics, for instance artificial silk, to produce an intensive, stable, and overdye-resistant mat or dulled finish.

It is found that excellent results can be obtained by first treating the fibrous material with a compound of a substance yielding in watery solution cations capable of lowering the surface tension (hereinafter called cation active substances), per se water insoluble, having a suitable acid residue, which compound is peptized by an excess of the cation active substance, and thereafter impregnating the material in a second bath which contains an acid radical compound yielding in watery solution anions of an equivalent weight of at least 90 but preferably 150 and higher and capable of reacting with the cation active substances to produce a water insoluble precipitate. Numerous cation active substances suitable for use in the first bath may be employed, for instance quaternary ammonium compounds containing at least one high molecular hydrocarbon residue with at least six carbon atoms, similar quaternary phosphonium and ternary sulphonium compounds, compounds of the asymmetrical oleyl-diethyl-ethylendiamin type, commonly referred to in the trade as "Sapamin", the iso-ureas and iso-thio-ureas substituted by high molecular residues at the O atom or/and S atom, the addition products of high molecular hydrocarbon halides with hexamethylene tetramine, alkyl and aryl guanidine with high molecular hydrocarbon residues and similar compounds. Suitable acid radical compounds for precipitating the water-insoluble compounds of the cation-active bodies are, for example, resin soaps, phosphoric acids, particularly pyro- and meta-phosphoric acids, further, soluble complex salts such as complex cyanides. The various acids may be used as such, if water-soluble and stable, or in the form of their soluble salts especially alkali and ammonia salts. The following compounds are especially suitable: Resin soap made by dissolving colophony in sodium hydroxide solution, the sodium salt of abietic acid, the potassium salt of hydroabietic acid, tannin and synthetic tanning agents, f. e. Neradol, sodium pyrophosphate, primary, secondary, and tertiary alkali metal orthophosphates, ammonium metaphosphate, alkali metal metaphosphates, potassium persulfate, ammonium persulfate, sodium perborate, sodium perphosphate, potassium zinc cyanide, sodium ferrocyanide.

The temperature can be ordinary or moderately elevated temperature, more than 60° C. being less suitable. pH value of the treatment liquid containing the acid radical compound of high molecular weight should suitably be between 7 and 4, higher acidities being deleterious for most textile materials.

When use is made of the tannates it is preferable to select those of light color, for example light tannin, in order to avoid clouding or turbidity, this being particularly important in the event the fibrous material is to be subsequently dyed a light color.

The following examples will serve to indicate the manner in which the process may be carried out, it being obvious that considerable modification of these examples is possible without materially affecting the result.

Example 1

Light tannin is dissolved in water and precipitated by the addition of dodecyl-pyridinium bisulfate solution, the water-insoluble tannin compound being thereby produced. It is preferable that some tannin remain in excess.

A portion of the tannate, from which the water has been removed as much as possible, is dispersed in three parts of 40% lauryl pyridinium sulfate solution. The finished product is a viscous paste, which remains homogeneous even on long standing.

Three grams per liter of the lauryl pyridinium tannate paste obtained as described are dissolved at 40° C. in water, the fibrous material or fabric is impregnated therein for about 15 minutes at this temperature, then centrifuged off and dried if necessary. The mat effect can be decreased or increased by shortening or lengthening the treatment but is not affected by variation of the quantity of the matting agent.

The centrifuged material is then treated in a 25° hot bath containing 3 gr. per liter of 35% sumac extract for 15 minutes. After the mat effect is sufficiently developed, the goods are again centrifuged off and may then be dyed, if desired, in the conventional manner. Thus dyeing may proceed as follows:

One per cent of dye, calculated on the amount of material being treated, is introduced into a dye bath having a ratio of 1 : 30, and dyeing is continued for about an hour at 60° C., 5% of Glaubers salt based on the amount of material is added at 80° C., and the bath is then carried to the boiling point. If the material undergoing treatment is artificial silk, any dyes suitable for use with corresponding artificial silk fiber may be used, for example the Sirius dyes for viscose silk. The resultant product is a perfectly matted and dyed fabric which will withstand washing and rubbing and which does not require treatment with special toning or lustering agents, the texture and feel of the goods being decidedly improved by the preliminary matting.

Example 2

Four parts of colophony or other natural or synthetic resin is dissolved in 6 parts of 55% dodecyl pyridinium bisulfate solution, this ratio of the component materials being variable over a wide range. It is only essential that there is an excess of the cation active substance (dodecyl pyridinium sulfate) over the colophony present. This excess of cation active substance peptizes the per se water-insoluble dodecyl pyridinium abietinate. Variation of the ratio, however, alters the mat effect, and by reason of altered solubility a corresponding variation of the working temperature is required. The composition thus produced may be used alone for the matting or as the first treatment bath, followed by a further treatment with a solution of a precipitating acid radical compound defined hereinbefore.

For example, use may be made of 4 grams per liter preparation with a bath ratio of 1 : 25 and the material treated at 40° C. for 20 minutes. The mat effect produced by this treatment is sufficient in many cases. When more intense dulling is desired, the mat effect can be intensified by treating the goods in a solution of resin soap (about 1 gram per liter; 44% resin).

Thereupon some Al ··· or Ba ·· salts can be added to the rinsing water (about 0.25 grams per liter) to combine the excess resin.

Artificial silk treated in this manner assumes a silky mat luster and has a pleasant handle.

Example 3

The process may be carried out as in Example 2, but instead of dodecyl pyridinium bisulfate, use is made of an equivalent quantity of asymmetrical diethyl-amino-ethyl-oleyl-amin-chlorhydrate, known to the trade as Sapamin.

Example 4

The procedure is similar to that set forth in Examples 2 and 3, but the resin soap in the first or second bath, or in both, is replaced by a corresponding quantity of sodium pyrophosphate.

Example 5

Ten per cent more of $BaCl_2$ is added to the first baths described in Examples 1 to 3 and use is made of dodecyl pyridinium bromide instead of dodecyl pyridinium bisulfate.

The following compounds have proven satisfactory in addition to those mentioned specifically hereinbefore: Tetradecyl, hexadecyl, and octadecyl pyridinium sulphate, undecenyl, dodecyl, tetradecyl, octadecyl, octadecenyl chinolinium sulphate, decyl pyridinium bromide, hexadecenyl chinolinium iodide, quaternary ammonium compounds derived from asymmetrical oleyl-diethyl-ethylenediamine by addition of dimethyl sulphate or diethyl sulphate or methyl iodide, heptyl-i-urea bromide, decyl-i-thiourea iodide, hexadecyl-i-thiourea iodide, the addition products of tetradecyl bromide or dodecyl iodide to hexamethylenetetramine, heptyl guanidine, tolyl guanidine, the quaternary ammonium compound prepared by the addition of the dodecyl ether of $\alpha$-glycerine bromhydrine $C_{11}H_{23}CH_2.O.CH_2.CHOH.CH_2Br$ to pyridin, and the quaternary ammonium compound formed by the addition of bromine-acetic acid dodecyl ester $BrCH_2.COO.CH_2.C_{11}H_{23}$ to chinoline.

It is impossible to give exact reaction formulae as the process is a colloid chemical reaction. It is similar in some respects to the peptizing of insoluble lime soap by means of sodium soap and precipitating such a colloidal solution of lime soap by further adding hard water containing soluble calcium salts.

The following scheme may serve to illustrate the process:
Ac designates an anion of at least 90 equivalent weight f. e. an abietic acid radical;
R designates a cation of at least 90 equivalent weight f. e. dodecylpyridinium;
Me designates alkali metal or ammonium.

$$Ac.Me + ROSO_3H \rightarrow R.Ac + MeHSO_4$$
soluble   soluble   insoluble   soluble
$$mR.Ac + nROSO_3H \rightarrow (mR.Ac).nR.OSO_3H$$
insoluble  soluble           soluble
$$(mR.Ac)nROSO_3H + nAcMe \rightarrow$$
soluble     soluble
$$(mR.Ac)2n.ROSO_3H$$
insoluble $m$ and $n$ designate whole numbers.

Having thus described the invention, what is claimed as new and desired to be secured by Letters Patent is:

1. A process of improving lustrous fibrous materials which comprises treating the material with a preparation made by mixing a solution of a water-soluble cation-active salt with a compound of an acid radical of high molecular weight reacting with the cation-active salt to form a precipitate, isolating the precipitate formed and peptizing said precipitate in a watery solution of said water-soluble cation-active salt, and subsequently treating said material with a solution of an acid radical containing compound yielding in aqueous solution anions of an equivalent weight of at least 90 reacting with said cation-active salt to form a precipitate.

2. A process of improving lustrous fibrous materials which comprises immersing the material in a dispersion, made by peptizing lauryl pyridinium tannate with lauryl pryidinium bisulfate, and subsequently treating the material with tannic acid solution.

3. A process of improving lustrous fibrous materials which comprises treating the material with a preparation made by mixing a solution of a water-soluble cation-active salt with a compound of an acid radical of high molecular weight reacting with the cation-active salt to form a precipitate, isolating the precipitate formed and peptizing said precipitate by a watery solution of said water-soluble cation-active salt, subsequently treating said material with a solution of an acid radical containing compound yielding in aqueous solution anions of an equivalent weight of at least 90 reacting with said cation-active salt to form a precipitate, and finally treating the material with a solution of resin soap.

4. A process of improving lustrous fibrous materials prior to the dyeing of the same which comprises treating the material with a preparation made by mixing a solution of a water-soluble cation-active salt with a compound of an acid radical of high molecular weight reacting with the cation-active salt to form a precipitate, isolating the precipitate formed and peptizing said precipitate in a watery solution of said water-soluble cation-active salt, subsequently treating said material with a solution of an acid radical containing compound yielding in aqueous solution anions of an equivalent weight of at least 90 reacting with said cation-active salt to form a precipitate, then treating the material first with a solution of resin soap, then with a solution of salts selected from the group of aluminum and barium salts.

WALTER KLING.
ERNST GÖTTE.